United States Patent
Kim et al.

(10) Patent No.: US 10,351,434 B2
(45) Date of Patent: Jul. 16, 2019

(54) METHOD FOR PREPARING SPHERICAL SILICA AEROGEL GRANULES AND SPHERICAL SILICA AEROGEL GRANULES PREPARED THEREBY

(71) Applicants: LG CHEM, LTD., Seoul (KR); INHA UNIVERSITY RESEARCH AND BUSINESS FOUNDATION, Incheon (KR)

(72) Inventors: Ye Hon Kim, Daejeon (KR); Je Kyun Lee, Daejeon (KR); Hae Jin Hwang, Seoul (KR); Kyoung Jin Lee, Gyeonggi-do (KR)

(73) Assignees: LG Chem, Ltd., Seoul (KR); Inha University Research and Business Foundation, Incheon (KR)

( * ) Notice: Subject to any disclaimer, the term of this patent is extended or adjusted under 35 U.S.C. 154(b) by 0 days.

(21) Appl. No.: 15/578,641

(22) PCT Filed: Mar. 16, 2017

(86) PCT No.: PCT/KR2017/002847
§ 371 (c)(1),
(2) Date: Nov. 30, 2017

(87) PCT Pub. No.: WO2017/171279
PCT Pub. Date: Oct. 5, 2017

(65) Prior Publication Data
US 2018/0134568 A1    May 17, 2018

(30) Foreign Application Priority Data

Mar. 28, 2016  (KR) .................. 10-2016-0036641

(51) Int. Cl.
*C01B 33/158* (2006.01)
*C01B 33/159* (2006.01)

(52) U.S. Cl.
CPC ........ *C01B 33/1585* (2013.01); *C01B 33/158* (2013.01); *C01B 33/159* (2013.01); *C01P 2004/32* (2013.01); *C01P 2004/61* (2013.01); *C01P 2006/10* (2013.01); *C01P 2006/12* (2013.01)

(58) Field of Classification Search
CPC . C01B 33/1585; C01B 33/158; C01B 33/159; C01P 2004/32; C01P 2004/61; C01P 2006/10; C01P 2006/12
USPC ........................................................ 428/402
See application file for complete search history.

(56) References Cited

U.S. PATENT DOCUMENTS

| | | | |
|---|---|---|---|
| 9,834,446 B2 | 12/2017 | Kim et al. | |
| 2009/0247655 A1 | 10/2009 | Kim et al. | |
| 2010/0119432 A1* | 5/2010 | Yeo ................... | C01B 33/1585 423/338 |
| 2014/0057111 A1 | 2/2014 | Tomimatsu Fujimoto et al. | |
| 2016/0280557 A1 | 9/2016 | Kim et al. | |

FOREIGN PATENT DOCUMENTS

| | | |
|---|---|---|
| EP | 2927194 A1 | 10/2015 |
| KR | 10-2006-0097223 | 9/2006 |
| KR | 10-0758019 | 9/2007 |
| KR | 10-2013-0035712 | 4/2013 |
| KR | 10-1310286 | 9/2013 |
| KR | 10-2013-0128365 | 11/2013 |
| KR | 20140005177 | * 1/2014 |
| KR | 20150093064 | 8/2015 |

* cited by examiner

*Primary Examiner* — Leszek B Kiliman
(74) *Attorney, Agent, or Firm* — Denton US LLP

(57) ABSTRACT

The present invention relates to a method for preparing spherical silica aerogel granules and spherical silica aerogel granules prepared thereby. The method for preparing spherical silica aerogel granules, which is suitable for mass production because droplets of a water glass solution are uniformly dispersed with a uniform size in a non-aqueous solvent using a surfactant in a certain step to reduce a process time and enhance productivity, may be provided. The spherical silica aerogel granules having a uniform size prepared by the method may be provided, wherein the spherical silica aerogel granules have a high working property and excellent flowability.

13 Claims, 7 Drawing Sheets

METHOD FOR PREPARING SPHERICAL SILICA AEROGEL GRANULES AND SPHERICAL SILICA AEROGEL GRANULES PREPARED THEREBY

CROSS-REFERENCE TO RELATED APPLICATION

This application is a National Stage Application of International Application No. PCT/KR2017/002847 filed on Mar. 16, 2017, which claims priority to and the benefit of Korean Patent Application No. 10-2016-0036641, filed on Mar. 28, 2016, both of which are incorporated herein by reference in their entirety for all purposes as if fully set forth herein.

TECHNICAL FIELD

The present invention relates to a method for preparing spherical silica aerogel granules, and more particularly, to a method for preparing spherical silica aerogel granules, which is characterized by using a surfactant in a certain step, and spherical silica aerogel granules prepared thereby.

BACKGROUND ART

A silica aerogel is an ultra-porous material in which nano-sized silica ($SiO_2$) particles form a three-dimensional network structure and which has a porosity of 95% or more. Thus, the silica aerogel may be effectively applied to various fields including thermal insulation materials, moisture absorbents, various carriers, low-dielectric coating films, anti-reflection films, and the like because the silica aerogel has very high porosity, specific surface area, and pore volume and very low thermal conductivity, dielectric constant, refractive index, and the like.

Generally, the silica aerogel may be prepared in monolithic and powdery shapes. When the silica aerogel is in a powdery shape, the silica aerogel may be composited with fibers so that the silica aerogel is commercialized in the form of an aerogel blanket or aerogel sheet. Because the blanket or sheet has flexibility, it may be bent, folded, or cut to a predetermined size or shape. Therefore, the silica aerogel may not only be applied to industrial fields such as thermal insulation panels for liquefied natural gas (LNG) carriers, industrial thermal insulation materials, space suits, transportations and vehicles, and thermal insulation materials for power generation but may also be applied to household goods such as jackets or shoes. Further, when used in fire doors as well as roofs or floors in houses such as apartments, the silica aerogel is highly effective in preventing fire.

A silica aerogel powder may be prepared by first preparing a silica wet gel, mechanically pulverizing the silica wet gel, and then drying the pulverized silica wet gel under a super-critical or atmospheric pressure condition. However, in this case, this method has a drawback in that it is very difficult to prepare an aerogel powder having a certain size because the method includes a process of mechanically pulverizing the silica wet gel.

Also, the fine silica aerogel powder has a drawback in that handling and working properties may be severely degraded because the silica aerogel powder is very light in weight to easily form dust and has poor powder flowability. Therefore, there is an urgent demand for establishment of technology for preparing a spherical powder in a granular shape.

Korean Unexamined Patent Publication No. 10-1310286 discloses a method for preparing a spherical silica aerogel powder, which includes preparing a high-purity silica sol from a water glass solution using an ion exchange resin, and subjecting the silica sol to solvent substitution and surface modification processes. However, the invention has disadvantages in that the spherical silica aerogel powder is very expensive due to low productivity because the method essentially required the long-term solvent substitution and surface modification processes, and is not suitable for mass production because the ion exchange resin is used.

The most difficult challenges in preparing the silica aerogel powder from the water glass solution include degraded productivity due to the long solvent substitution and surface modification processes, difficulty in obtaining a powder having a uniform spherical shape, and the like.

Accordingly, the present inventors have conducted research to solve the above problems, and found a novel method for preparing a spherical silica aerogel powder having a uniform spherical shape, which is capable of reducing a process time.

PRIOR-ART DOCUMENT

Patent Document 1: Korean Unexamined Patent Publication No. 10-1310286

DISCLOSURE

Technical Problem

Therefore, the present invention is designed to solve the problems of the prior art, and it is an object of the present invention to provide a method for preparing spherical silica aerogel granules, which is suitable for mass production because droplets of a water glass solution are uniformly dispersed with a uniform size in a non-aqueous solvent using a surfactant to reduce a process time and enhance productivity.

It is another object of the present invention to provide spherical silica aerogel granules having a uniform size prepared by the method, wherein the spherical silica aerogel granules have a high working property and excellent flowability.

Technical Solution

To solve the above problems, according to an aspect of the present invention, there is provided a method for preparing spherical silica aerogel granules, which includes:

a) mixing a water glass solution and a solvent to prepare a mixed solution;

b) adding a surfactant to the mixed solution;

c) adding a neutralizing agent to the mixed solution to form a silica sol;

d) adding a gelling agent to the silica sol to form a silica gel;

e) subjecting the silica gel to solvent substitution and adding a surface modifying agent to the silica gel to hydrophobicize the silica gel; and f) drying the hydrophobicized silica gel.

According to another aspect of the present invention, there are provided spherical silica aerogel granules prepared by the method.

Advantageous Effects

The method for preparing spherical silica aerogel granules according to the present invention can be useful in reducing a process time and enhancing productivity by uniformly dispersing droplets of a water glass solution with a uniform size in a non-aqueous solvent using a surfactant to perform gelation, solvent substitution, and surface modification within a short time, and thus is suitable for mass production.

Also, the spherical silica aerogel granules prepared by the method have a high working property and excellent flowability because the spherical silica aerogel granules have a uniform size and excellent sphericity.

Further, the present invention can be effective in significantly reducing manufacturing costs for silica aerogels because inexpensive water glass is used as a starting material for preparing a silica aerogel and an expensive non-aqueous solvent used for solvent substitution and surface modification may be recycled, and in reducing risks and costs in processes by using an atmospheric pressure drying method.

BEST MODE

Figure 1:
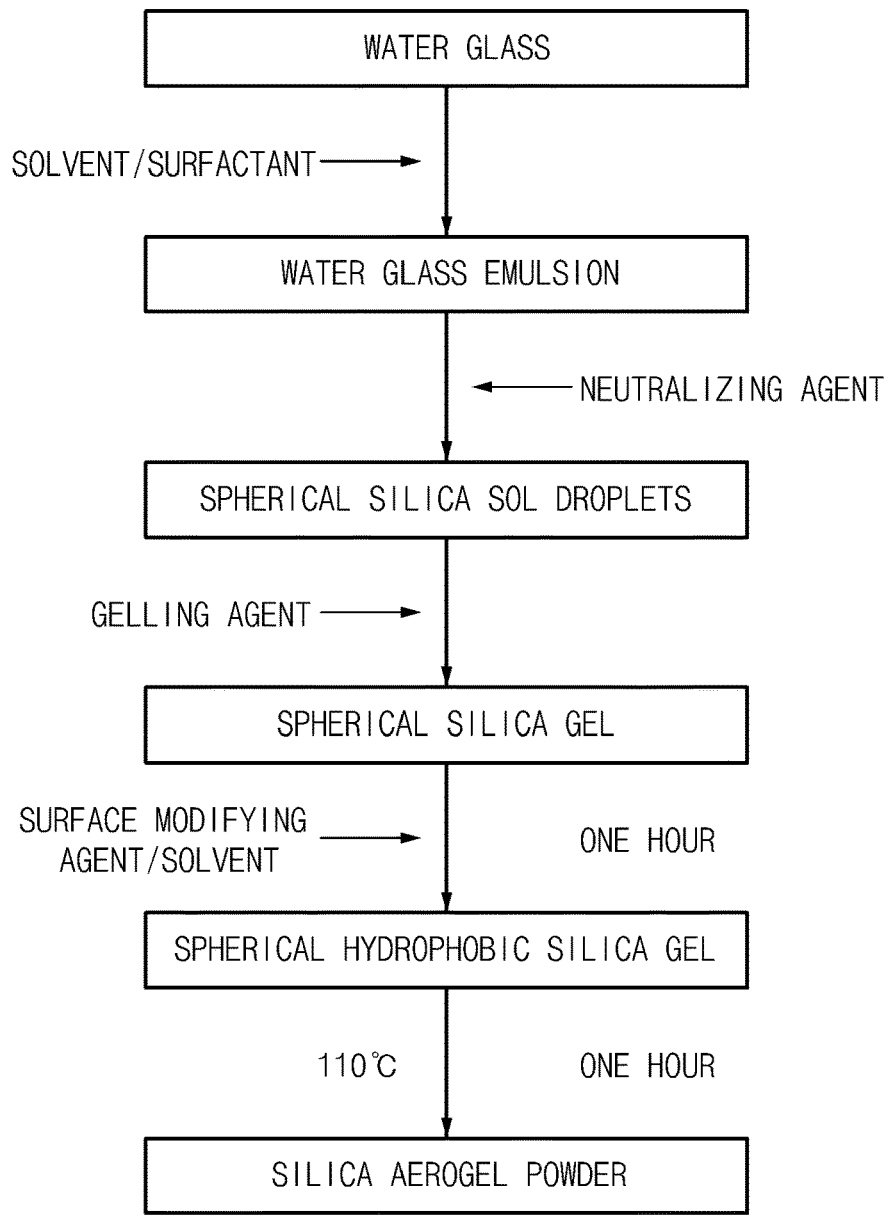
FIG. 1 is a schematic diagram showing a method for preparing spherical silica aerogel granules according to the present invention.

Hereinafter, the present invention will be described in further detail to aid in understanding the present invention. In this case, the terms and/or words used in this specification and the appended claims are not to be interpreted as limited to commonly used meanings or meanings in dictionaries and should be interpreted with meanings and concepts which are consistent with the technological scope of the present invention based on the principle that the present inventors have appropriately defined concepts of terms to describe the present invention in the best way.

The present invention provides a method for preparing spherical silica aerogel granules, which includes:
a) mixing a water glass solution and a solvent to prepare a mixed solution;
b) adding a surfactant to the mixed solution;
c) adding a neutralizing agent to the mixed solution to form a silica sol;
d) adding a gelling agent to the silica sol to form a silica gel;
e) subjecting the silica gel to solvent substitution and adding a surface modifying agent to the silica gel to hydrophobicize the silica gel; and
f) drying the hydrophobicized silica gel.

First, the present invention includes step a) of mixing a water glass solution and a solvent to prepare a mixed solution.

According to one exemplary embodiment of the present invention, water glass may be composed of $Na_2O \cdot nSiO_2$ (n=2 to 4) and a small amount of $Fe_2O_3$, and may have a concentration of 28 to 30% by weight.

Water glass exhibits high adhesive strength and is strongly alkaline. In this case, water glass is neutralized with an acid to obtain a precipitate, which is then referred to as a silica gel. The silica gel may be used as a desiccant.

In the case of an aerogel powder using a conventional aerogel, an alkoxide material such as trimethoxysilane (TMOS) or tetraethoxysilane (TEOS) has been used as a raw material in the sol-gel synthesis. The aerogel powder is prepared by dispersing a metal alkoxide material such as TMOS and TEOS in a solvent such as ethanol or isopropanol, followed by polymerizing and hydrolyzing the alkoxide material. In this case, the aerogel powder has a drawback in that the aerogel powder has a high unit cost of production because the expensive alkoxide material is used.

However, in the present invention, the aerogel powder has an advantage in that the manufacturing costs for silica aerogels may be significantly reduced because an inexpensive industrial water glass is used as the starting material.

Meanwhile, because a conventional water glass is easily gelled according to a change in pH of a solvent to be mixed, different solvents may be used before/after a time point of gelation for stabilization when the silica aerogel is prepared. Specifically, a solvent that does not react with the water glass may be used before the gelation, and types of solvents suitable for being mixed with materials generated after the gelation may be restrictedly used after the gelation.

Therefore, when the water glass solution and the solvent are mixed, the water glass solution and the solvent do not react with each other, but droplets of the spherical water glass solution may be formed so that the droplets are included in a mixed solution.

According to one exemplary embodiment of the present invention, the solvent that may be used to prepare the mixed solution of step a) is a solvent that does not cause a change in pH of the water glass. Specifically, a hydrophobic non-polar organic solvent may be used as the solvent. More specifically, hexane or cyclopentane may be used as the solvent.

Next, the present invention includes step b) of adding a surfactant to the mixed solution.

The surfactant is a material that is adsorbed onto a surface of a liquid to increase activity in the interface and significantly change properties of the liquid. In the present invention, the surfactant serves to prevent aggregation between the droplets of the water glass solution in the mixed solution and stabilize the droplets of the water glass solution.

That is, in the present invention, the surfactant may be added to the mixed solution so that the surfactant is adsorbed onto a surface of the water glass solution, thereby forming droplets of the water glass solution having a uniform size, and uniformly dispersing the droplets of the water glass solution in a solvent such as hexane, and the like.

The droplets of the water glass solution having a uniform size of 1 to 1,000 μm, which are uniformly dispersed in the solvent, may be subjected to gelation, solvent substitution, and surface modification processes within a short time so that a total process time for the silica aerogel granules may be reduced in a range of 1 to 5 hours, more specifically in a range of 1 to 2 hours. The term "total process time" used in this specification refers to a time required to perform all steps a) to f) of the method according to the present invention.

In this way, because the problems of the conventional methods requiring the long-term solvent substitution and surface modification processes may be solved by significantly reducing a process time, the method of the present invention has an effect of improving productivity to reduce a product price and enable mass production.

Specifically, the surfactant of step b) used in the present invention may include one or more selected from the group consisting of sorbitan monooleate, sorbitan monostearate, sorbitan monopalmitate, and sorbitan monolaurate. More specifically, the surfactant may be sorbitan monooleate (SPAN 80).

The surfactant may be used at a content of 3.0 to 9.0% by volume ratio, specifically 3 to 7% by volume ratio with respect to the mixed solution, but the range and optimum content of the surfactant may vary depending on a composition ratio (water glass:hexane) of the mixed solution. When the surfactant is used at a very small amount of less than 3.0% by volume ratio, it may be difficult to form droplets of the water glass solution having a uniform size. On the other hand, when the surfactant is used at a highly excessive amount of greater than 9.0% by volume ratio, the droplets of the water glass solution having a small uniform size may be obtained, but problems regarding aggregation between the droplets and the prepared powder and the remaining of the surfactant after washing several times may be caused. Therefore, it is desirable that the surfactant is preferably added within this content range.

Also, the most important thing is the processing order in which the surfactant is added in a certain step. Specifically, in the present invention, the surfactant is preferably added to the mixed solution including the droplets of the water glass solution prior to preparation of a silica sol.

Generally, because the silica sol has very high particle surface activity, the silica sol has a characteristic of easily causing aggregation between particles or a non-uniform polymerization/condensation reaction. For example, even when the silica sol stands at room temperature in the absence of a catalyst, abnormal gelation or non-uniform particle formation may be caused. When the surfactant is added to the silica sol having such a characteristic, it is possible to form droplets within a short time, but it is very difficult to maintain the droplets in a stabilized state for a long time or uniformly control the size of the droplets. Also, a large amount of time may also be required to perform surface modification and solvent substitution after the gelation. Such a problem is not a big barrier to preparing a small amount of a silica aerogel on a laboratory scale. However, when the silica sol is applied to a process for mass production, it is impossible to ensure the shapes and performance of final products. In contrast, because the water glass solution is stable and has low reactivity, the water glass solution may be stably maintained intact even when exposed to the air or moisture. Therefore, when the surfactant is added to the water glass solution to form droplets, a uniform size of the droplets may be easily controlled. Thus, it is easy to prepare monodispersed droplets, and it is possible to stably maintain the droplets having a uniform size even when the droplets are stored for a long period of time for use in subsequent processes. Therefore, the addition of the surfactant should be performed prior to formation of the silica sol.

Then, the present invention includes step c) of adding a neutralizing agent to the mixed solution to form a silica sol.

The neutralizing agent of step c) according to the present invention may be used at a content of 5 to 10% by volume ratio, specifically 5 to 8% by volume ratio with respect to the mixed solution. When the neutralizing agent is used at a small content of less than 5% by volume ratio, Na ions of the water glass that may serve as impurities after the preparation may not be sufficiently removed. On the other hand, when the neutralizing agent is used at an excessive content of greater than 10% by volume ratio, insufficient gelation may be caused due to a change in pH. Therefore, it is desirable that the neutralizing agent is added within this content range.

After step c), the present invention may also include additionally stirring the mixed solution at 400 to 800 rpm to form droplets of a spherical silica sol. Because the droplets of the silica sol having a smaller uniform size may be obtained as the stirring speed increases, the size of the silica aerogel may be adjusted to be small. However, even when the stirring speed increases to 800 rpm or higher, an effect of increasing the stirring speed is not actually significant. Therefore, it is desirable that the stirring speed is maintained within this range.

Subsequently, the present invention includes step d) of adding a gelling agent to the silica sol to form a silica gel.

The gelling agent used in the present invention may include one or more selected from the group consisting of ammonia, acetone, ethanol, and isopropanol.

For example, ammonia is in the form of an aqueous solution, and thus may be added dropwise using a pipette, and the like. The pH of the mixed solution increases by adding ammonia. In this case, the pH value is preferably adjusted to pH 5 to 7. When the pH value is outside the range of this pH range, aggregation between the droplets of the silica sol may occur due to an increase in gelation time, which makes it difficult to prepare spherical granules. More specifically, the pH value may be adjusted to pH 6 to 6.5. When the pH value satisfies this pH range, the gelation may be terminated in 10 minutes, and a spherical silica wet gel may be obtained.

Also, an aging step after the gelation may be performed at 30 to 80° C.

When the aging step is performed at less than 30° C., the spherical silica wet gel may not be sufficiently aged. On the other hand, when the aging step is performed at greater than 80° C., which is higher than the boiling point of ethanol, the solvent may be evaporated. Thus, the aging step may be performed at 30 to 80° C. for 10 minutes to 24 hours so that an intact network structure is formed in the gel.

Then, the present invention includes step e) of subjecting the silica gel to solvent substitution and adding a surface modifying agent to the silica gel to hydrophobicize the silica gel.

After a wet gel is prepared from a silica precursor such as water glass, liquid components in the wet gel should be removed without destroying a microstructure. In this case, the wet gel has pores filled with water. When the solvent is removed through a subsequent drying process, a pore structure may shrink and crack due to high surface tension of water at the gas/liquid interface while a liquid solvent is vaporized into a gaseous phase. As a result, a decrease in specific surface area and a change in pore structure of the finally prepared silica aerogel are caused. Therefore, it is necessary to replace water having high surface tension with an organic solvent having relatively lower surface tension in order to maintain a pore structure of the wet gel.

As the solvent to be replaced, a hydrophilic polar organic solvent, specifically an alcohol-based solvent including a monohydric alcohol such as methanol, ethanol, isopropanol, or butanol; a polyhydric alcohol such as glycerol, ethylene glycol, propylene glycol, diethylglycol, dipropylene glycol, or sorbitol; and a mixture of two or more thereof may be used as the solvent that may be mixed with the silica gel after gelation. More specifically, among these, a monohydric alcohol-based solvent having 1 to 6 carbon atoms, such as methanol, ethanol, isopropanol, or butanol, may be used in consideration of miscibility with water and a hydrophobic aerogel.

Also, the dried silica aerogel has heat conductivity maintained at a low level immediately after the drying, but has a drawback in that heat conductivity gradually increases as hydrophilic silanol groups (Si—OH) present on a surface of silica absorb moisture in the air. Therefore, a surface of the silica aerogel has to be modified to have hydrophobicity in order to maintain low heat conductivity.

Accordingly, in the present invention, a hydrophilic gel is modified into a hydrophobic gel by the addition of the surface modifying agent. Here, one or more selected from the group consisting of hexamethyldisilane (HMDS), ethyltriethoxysilane, trimethoxysilane, triethylethoxysilane, methyltrimethoxysilane, ethyltrimethoxysilane, trimethylchlorosilane (TMCS), and triethylchlorosilane may be used as the surface modifying agent of the present invention, but the present invention is not limited thereto. However, the surface modifying agent is preferably used at a content of 5 to 20% by volume ratio with respect to the mixed solution. When the content of the surface modifying agent used is less than 5% by volume ratio, an increase in density of granules may be caused due to a slow surface modification rate, and a hydrophobicity level of the prepared powder may be severely degraded. On the other hand, when the content of the surface modifying agent used is greater than 20% by volume ratio, it is difficult to maintain a spherical shape of the silica gel due to a sudden change in the surface modification rate, or the processing or manufacturing costs may significantly increase due to the use of an excessive amount of the surface modifying agent.

Such a surface modification process is performed at room temperature for an hour, and may be repeatedly performed 4 to 6 times. Also, the surface modification process may be performed at a moderate temperature (60° C. or less). In this case, a time and the number of the surface modification process may be reduced by increasing a reaction rate.

Finally, the present invention includes step 0 of drying the hydrophobicized silica gel.

Before a by-product remaining after the surface modification is dried, the by-product may be washed with a non-polar organic solvent, and then dried to prepare silica aerogel granules having high purity.

Specifically, the washing may be performed using one or more non-polar organic solvents selected from the group consisting of isopropyl alcohol, hexane, heptane, xylene, and cyclohexane.

Also, the drying may be performed at 70 to 200° C. using an atmospheric pressure drying method. The silica aerogel may be prepared using a super-critical drying or vacuum extraction method in addition to the atmospheric pressure drying method of the present invention. However, because the super-critical drying method requires expensive equipment such as an autoclave, and has high-temperature and high-pressure risks, the super-critical drying method is not suitable for mass production and commercialization of the silica aerogel due to a high unit cost of production and risks in processes.

To improve the above problems, the present invention is characterized by providing a commercially available method for preparing spherical hydrophobic silica aerogel granules having low density and thermal conductivity using the atmospheric pressure drying method.

Also, the present invention provides spherical silica aerogel granule prepared by the method for preparing spherical silica aerogel granules according to the present invention.

Because the silica aerogel of the present invention has a spherical shape as granules having a uniform size, and has a low tap density and a high specific surface area, the silica aerogel is characterized by exhibiting a high working property and excellent flowability.

The spherical silica aerogel granules of the present invention are characterized by having an average particle diameter ($D_{50}$) of 1 to 1,000 μm.

In the present invention, the average particle diameter ($D_{50}$) may, for example, be measured using a laser diffraction method or a scanning electron microscope (SEM) image. The average particle diameter ($D_{50}$) of the granules may be defined as a particle diameter calculated with respect to 50% of a particle diameter distribution.

Also, the spherical silica aerogel granules having a small uniform size may be obtained by the method of the present invention. In this case, the spherical silica aerogel granules have a density of 0.05 to 0.3 g/cm$^3$ and a specific surface area of 500 to 900 m$^2$/g.

The spherical silica aerogel granules of the present invention may be effectively used for one or more selected from the group consisting of a thermal insulation material, a moisture absorbent, a sound absorbent, carrier, a low-dielectric coating film, and an anti-reflection film.

MODE FOR INVENTION

Hereinafter, examples of the present invention will be described in detail so that a person having ordinary skill in the art to which the present invention belongs can easily put the present invention into practice. However, it should be understood that the present invention can be implemented in various different forms, and is not limited to the embodiments disclosed below.

Example 1

Water glass (sodium silicate commercially available from Young Il Chemical Co., Ltd.; silica content: 28 to 30% by weight, $SiO_2:Na_2O$=3.52:1) was diluted with distilled water to prepare a water glass solution having an $SiO_2$ content of 7.5% by weight. Thereafter, the water glass solution was mixed with hexane at a volume ratio of 1:1 to prepare a mixed solution. As the surfactant, sorbitan monooleate (SPAN 80) was added at a volume ratio of 5% to the mixed solution. Subsequently, acetic acid that was a neutralizing agent was added at a volume ratio of 10% with respect to the mixed solution, and isopropanol that was a gelling agent was added at a volume ratio of 1:2 (mixed solution:gelling agent) to prepare a silica gel. After the solvent other than the gelled silica was removed, ethanol was also added to perform solvent substitution, and HMDS that was a surface modifying agent was added at a volume ratio of 17% with respect to the mixed solution, stirred, and then kept for approximately an hour. The resulting aerogel was washed with ethanol, and then dried in a 110° C. oven to prepare a spherical hydrophobic aerogel.

Examples 2 to 8

Spherical silica aerogel granules were prepared in the same manner as in Example 1 under varying preparation conditions as listed in the following Table 1.

Comparative Examples 1 to 4

Spherical silica aerogel granules were prepared in the same manner as in Example 1 under varying preparation conditions as listed in the following Table 1. In particular, the spherical silica aerogel granules of Comparative Example 4 were prepared in the different processing order than in Example 1 by adding the surfactant after preparation of the silica sol.

The tap density was analyzed using a tap density tester (TAP-2S commercially available from Logan Instruments Co., Ltd.), and the hydrophobicity level was evaluated from a contact angle of water after one drop of water dribbles down on a surface of a molded sample obtained by compressively molding an aerogel powder into a disc shape (having a diameter of 25 mm and a thickness of 5 mm). The contact angle was measured from an image, which was obtained by photographing a close-up image of a contact region between the drop of water and the sample, using a goniometer. In this case, the hydrophobicity level was evaluated to be low when the contact angle was less than or equal to 90°, and high when the contact angle was greater than or equal to 90°. The BET surface area was analyzed as an amount of nitrogen gas absorbed according to a partial pressure ($0.01 < p/p0 < 1$) using an ASAP 2010 system commercially available from Micromeritics Instrument Corp.

TABLE 1

|  | Surfactant (SPAN 80, vol %) | Neutralizing agent (vol %) | Gelling agent | Solvent of gelation | Surface modifying agent |
| --- | --- | --- | --- | --- | --- |
| Example 1 | 5% | 10% | Isopropanol | Ethanol | HMDS 17% |
| Example 2 | 5% | 10% | Ammonia (30%) | Ethanol | HMDS 8.5% |
| Example 3 | 5% | 10% | Isopropanol | Ethanol | HMDS 8.5% |
| Example 4 | 5% | 10% | Ammonia (30%) | Cyclopentane | HMDS 8.5% |
| Example 5 | 5% | 10% | Ammonia (30%) | Hexane | HMDS 8.5% |
| Example 6 | 5% | 5% | Ammonia (30%) | Ethanol | HMDS 8.5% |
| Example 7 | 5% | 5% | Ammonia (30%) | Acetone | HMDS 1.7% |
| Example 8 | 5% | 5% | Ammonia (30%) | Acetone | TMCS 17% |
| Comparative Example 1 | — | 10% | Isopropanol | Ethanol | HMDS 17% |
| Comparative Example 2 | 2.5% |  |  |  |  |
| Comparative Example 3 | 10% |  |  |  |  |
| Comparative Example 4 | 5% |  |  |  |  |

Experimental Example 1: Determination of Scanning Electron Microscope (SEM) Image SEM images of the spherical silica aerogel granules prepared in Example 1 and Comparative Examples 1 to 4 were determined.

Figure 2A:
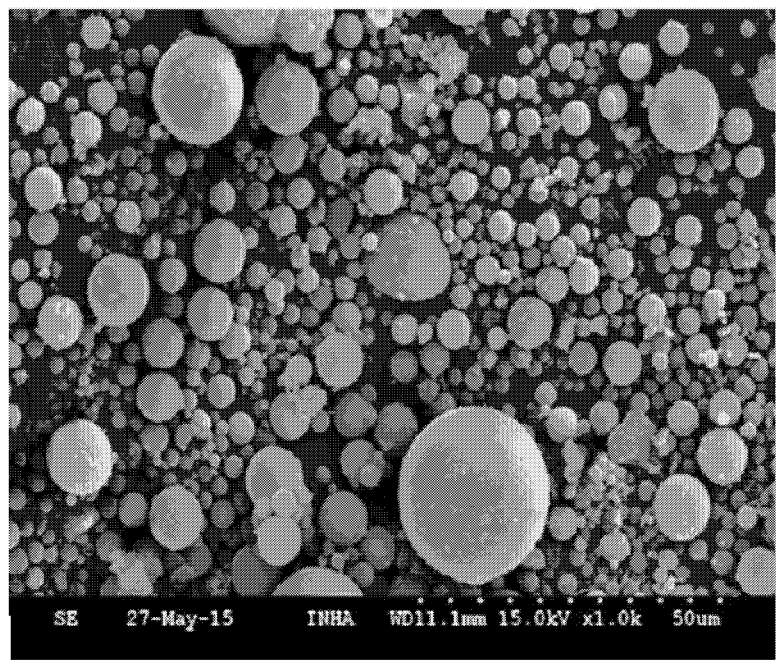
FIG. 2A is a scanning electron microscope (SEM) image of spherical silica aerogel granules prepared in Example 1 of the present invention (scale bar: 50.0 μm).
Figure 2B:
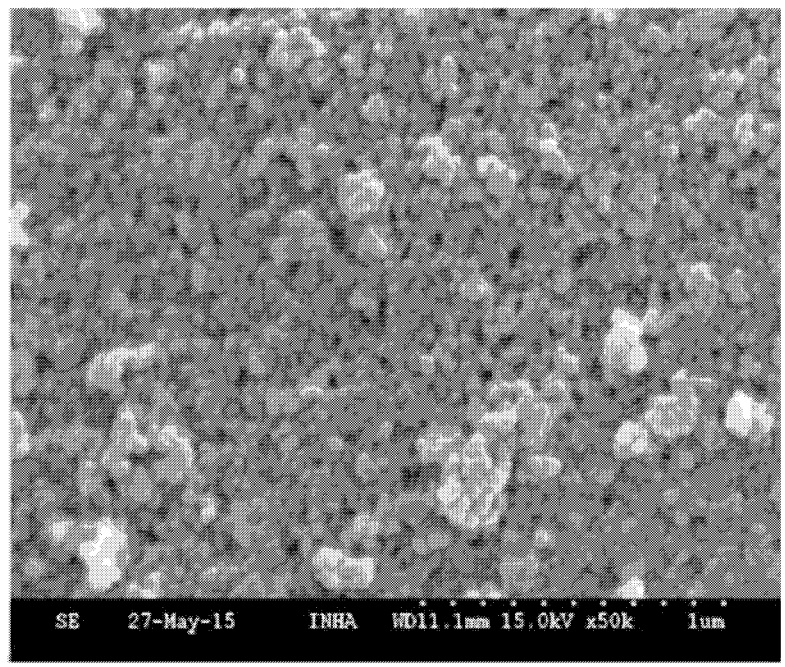
FIG. 2B is an SEM image of the spherical silica aerogel granules prepared in Example 1 of the present invention (scale bar: 1.0 μm).

As shown in FIGS. 2A and 2B (Example 1), it can be seen that the silica aerogel prepared by the method of the present invention was a spherical granule having a uniform size of 10 to 50 μm.

Figure 3:
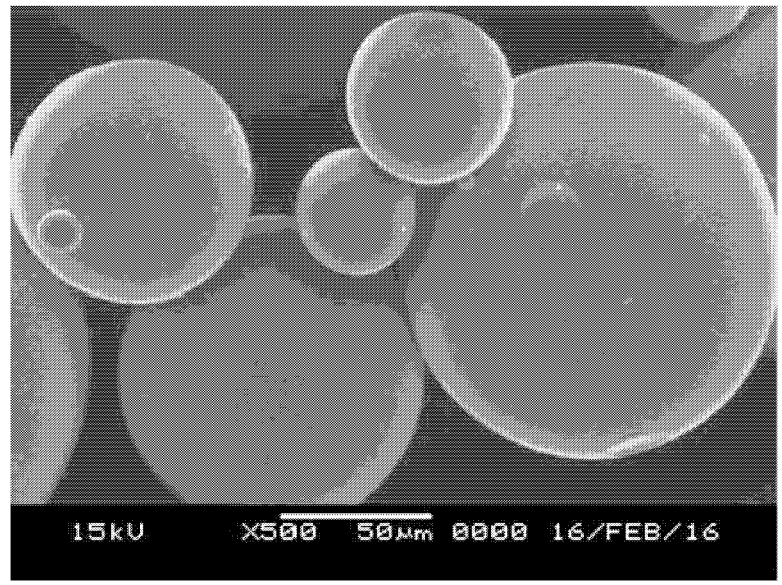
FIG. 3 is an SEM image of spherical silica aerogel granules prepared in Comparative Example 1 of the present invention (scale bar: 50.0 μm).
Figure 4:
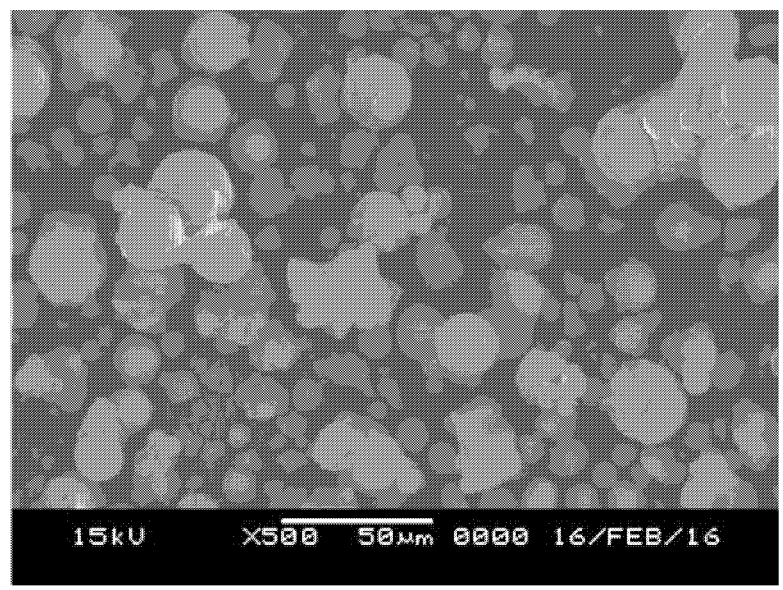
FIG. 4 is an SEM image of spherical silica aerogel granules prepared in Comparative Example 2 of the present invention (scale bar: 50.0 μm).
Figure 5:
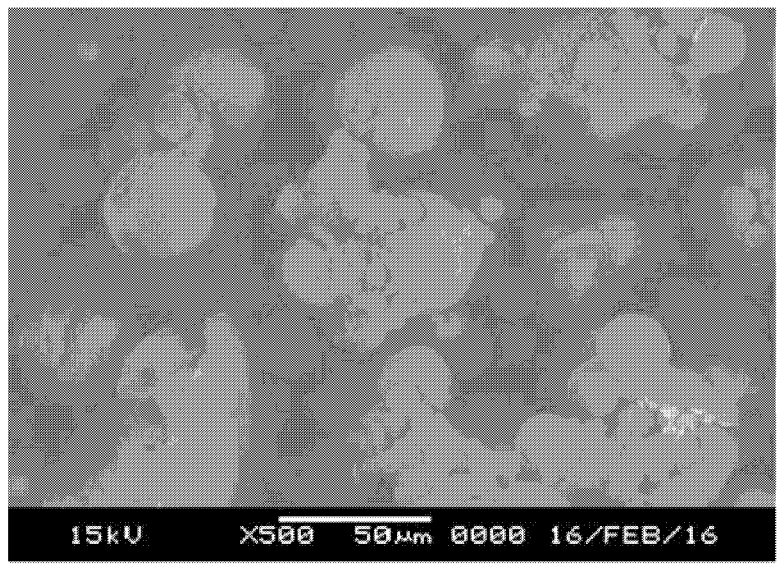
FIG. 5 is an SEM image of spherical silica aerogel granules prepared in Comparative Example 3 of the present invention (scale bar: 50.0 μm).

Meanwhile, as shown in FIG. 3 (Comparative Example 1), it can be seen that the silica aerogel had a spherical shape, but had an increased particle size. As shown in FIG. 4 (Comparative Example 2), it can be seen that some particles of the silica aerogel had poor sphericity. Also, as shown in FIG. 5 (Comparative Example 3), it can be seen that some particles of the silica aerogel had poor sphericity due to the presence of impurities or aggregation between the particles.

Figure 6:
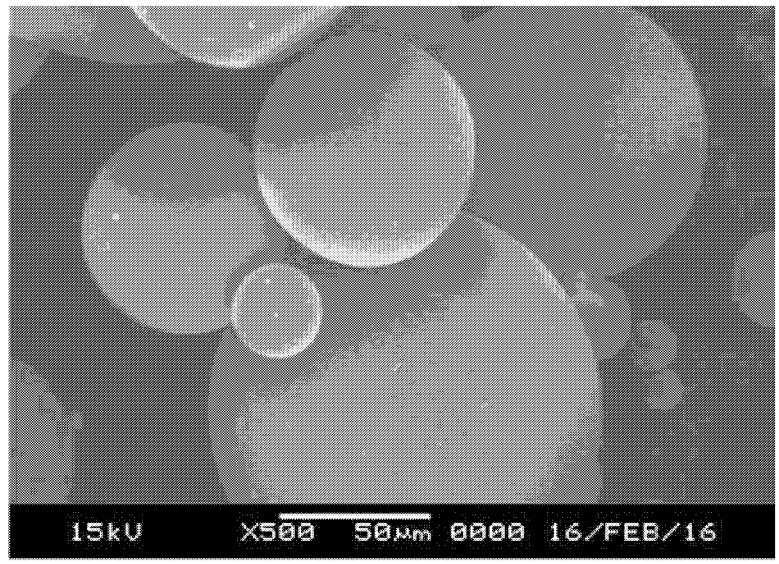
FIG. 6 is an SEM image of spherical silica aerogel granules prepared in Comparative Example 4 of the present invention (scale bar: 50.0 μm).

As shown in FIG. 6 (Comparative Example 4), it can be seen that the silica aerogel had a spherical shape, but had an increased particle size, like in FIG. 1.

Experimental Example 2: Evaluation of Physical Properties

The tap densities, hydrophobicity levels and BET surface areas of the spherical silica aerogel granules prepared in Examples and Comparative Examples were measured. The results are listed in the following Table 2.

TABLE 2

|  | Tap density (g/cm³) | Hydrophobicity level | BET surface area (m²/g) |
| --- | --- | --- | --- |
| Example 1 | 0.10 | High | 729 |
| Example 2 | 0.10 | Low | 699 |
| Example 3 | 0.09 | Low | 810 |
| Example 4 | 0.16 | High | 656 |
| Example 5 | 0.20 | Low | 457 |
| Example 6 | 0.13 | High | 754 |
| Example 7 | 0.26 | Low | 411 |
| Example 8 | 0.34 | High | 371 |
| Comparative Example 1 | 0.75 | Low | 213 |
| Comparative Example 2 | 0.34 | High | 354 |
| Comparative Example 3 | 0.16 | High | 524 |
| Comparative Example 4 | 0.72 | Low | 266 |

<Effect on Use of Surfactant>

As listed in Table 2, it was confirmed that the spherical silica aerogel granules of Examples 1 to 8 of the present invention, in which the surfactant was used, generally had a low tap density and a high specific surface area.

On the other hand, it can be seen that the spherical silica aerogel granules of Comparative Example 1, in which the surfactant was not used, had a spherical shape but had a very increased particle size, as shown in FIG. 3, and that the spherical silica aerogel granules had poor physical properties due to a significant increase in tap density.

<Effect on Amount of Surfactant Used>

Also, when the surfactant was used, it can be seen that the desired effects of the present invention were not achieved when the surfactant was not used in a proper content range.

Specifically, it can be seen that the silica aerogel granules of Example 1 of the present invention in which the surfactant was used at a content of 5% by weight with respect to the mixed solution had a spherical shape having a uniform size, and had a low tap density and a high specific surface area. On the other hand, it can be seen that some of the granules had poor sphericity, the size of the granules was not uniform, and aggregation between the granules occurred in the case of Comparative Example 2 in which the surfactant was used at a content of 2.5% by weight, as shown in FIG. 4, and that the tap density was also somewhat increased, compared to that of the present invention. Also, it can be seen that the silica aerogel granules of Comparative Example 3 in which the surfactant was used at a content of 10% by weight had a somewhat low tap density, but SPAN80 remained as impurities even after washing because an excessive amount of SPAN80 was used, or aggregation between the granules occurred, as shown in FIG. 5.

<Effect on Processing Order for Addition of Surfactant>

When the surfactant was used, it can also be seen that the most important thing was the processing order in steps in which the surfactant was used.

Specifically, it can be seen that the silica aerogel granules of Comparative Example 4 in which the surfactant was added after the silica sol was formed had a spherical shape but had a significantly increased particle size, compared to the silica aerogel granules of Example 1 in which the surfactant was used during formation of the droplets of the water glass solution, as shown in FIG. 6, and that the spherical silica aerogel granules had poor physical properties due to a significant increase in tap density.

Because these results of measurement were similar to those of Comparative Example 1 in which the surfactant was not used, it was confirmed that the effects of the present invention was not achieved when the surfactant was added after the silica sol was prepared.

Although the present invention presented herein has been disclosed for illustrative purposes, it should be understood to those skilled in the art to which the present invention belongs that various modifications and changes are possible without departing from the scope and spirit of the present invention. Therefore, the exemplary embodiments disclosed above are illustrative in all aspects, but not intended to limit the present invention.

The invention claimed is:

1. A method for preparing spherical silica aerogel granules, comprising:

a) mixing a water glass solution and a non-aqueous solvent to prepare a mixed solution;

b) adding a surfactant to the mixed solution to form dispersed droplets of the water glass solution in the solvent prior to preparation of a silica sol;

c) adding a neutralizing agent to the mixed solution to form a silica sol;

d) adding a gelling agent to the silica sol to form a silica gel;

e) subjecting the silica gel to solvent substitution and adding a surface modifying agent to the silica gel to hydrophobicize the silica gel; and f) drying the hydrophobicized silica gel, wherein the surfactant in step b) is included at a volume ratio of 3.0 to 9.0% with respect to the mixed solution.

2. The method of claim 1, wherein the surfactant in step b) comprises one or more surfactants selected from the group consisting of sorbitan monooleate, sorbitan monostearate, sorbitan monopalmitate, and sorbitan monolaurate.

3. The method of claim 1, wherein the neutralizing agent in step c) is included at a volume ratio of 5 to 10% with respect to the mixed solution.

4. The method of claim 1, wherein the gelling agent in step d) comprises one or more selected from the group consisting of ammonia, acetone, ethanol, and isopropanol.

5. The method of claim 1, wherein the surface modifying agent in step e) is included at a volume ratio of 5 to 20% with respect to the mixed solution.

6. The method of claim 1, wherein a total process time of the method is in a range of 1 to 5 hours.

7. Spherical silica aerogel granules prepared by the method of claim 1.

8. The spherical silica aerogel granule of claim 7, wherein the spherical silica aerogel granules have an average particle diameter ($D_{50}$) of 1 to 1,000 μm.

9. The spherical silica aerogel granule of claim 7, wherein the spherical silica aerogel granules have a density of 0.05 to 0.3 g/cm$^3$.

10. The spherical silica aerogel granule of claim 7, wherein the spherical silica aerogel granules have a specific surface area of 500 to 900 m$^2$/g.

11. The spherical silica aerogel granule of claim 7, wherein the spherical silica aerogel granules are used in one or more selected from the group consisting of a thermal insulation material, a moisture absorbent, a sound absorbent, a carrier, a low-dielectric coating film, and an anti-reflection film.

12. The method of claim 1, wherein the non-aqueous solvent is a hydrophobic non-polar organic solvent.

13. The method of claim 1, wherein the non-aqueous solvent is a hexane or cyclopentane.

* * * * *